United States Patent

Brown

(10) Patent No.: US 6,809,637 B1
(45) Date of Patent: Oct. 26, 2004

(54) MONITORING A CONDITION OF A PNEUMATIC TIRE

(75) Inventor: Robert Walter Brown, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/048,813

(22) PCT Filed: Sep. 3, 1999

(86) PCT No.: PCT/US99/20271
§ 371 (c)(1),
(2), (4) Date: Feb. 1, 2002

(87) PCT Pub. No.: WO01/17806
PCT Pub. Date: Mar. 15, 2001

(51) Int. Cl.$^7$ .............................................. B60C 23/00
(52) U.S. Cl. ...................... 340/443; 340/447; 340/589; 73/146.4
(58) Field of Search ................................ 340/442–449, 340/589; 73/146, 146.4, 146.2–146.8; 156/123; 152/152.1; 116/34 R, 34 A, 34 B

(56) References Cited

U.S. PATENT DOCUMENTS

| | | | |
|---|---|---|---|
| 3,281,784 A | 10/1966 | Farthing | 340/443 |
| 3,510,835 A | 5/1970 | Gilbert | 340/449 |
| 3,553,060 A | 1/1971 | Waltz | 156/516 |
| 3,665,387 A | 5/1972 | Enabnit | 340/448 |
| 3,713,099 A | 1/1973 | Hemstreet | 382/222 |
| 3,787,806 A | 1/1974 | Church | 340/447 |
| 3,810,090 A | 5/1974 | Davis, Jr. et al. | 340/447 |
| 3,831,161 A | 8/1974 | Enabnit | 340/507 |
| 3,872,424 A | 3/1975 | Enabnit | 340/442 |
| 3,898,615 A | 8/1975 | Hosaka | 340/443 |
| 4,052,696 A | 10/1977 | Enabnit | 340/448 |
| 4,067,235 A | 1/1978 | Markland et al. | 73/146.5 |
| 4,099,157 A | 7/1978 | Enabnit | 340/438 |
| 4,220,907 A | 9/1980 | Pappas et al. | 322/3 |
| 4,334,215 A | 6/1982 | Frazier et al. | 340/447 |
| 4,570,152 A | 2/1986 | Melton et al. | 340/449 |
| 4,760,371 A | 7/1988 | Don | 340/449 |
| 4,909,074 A | 3/1990 | Gerresheim et al. | 73/146.4 |
| 4,911,217 A | 3/1990 | Dunn et al. | 152/152.1 |
| 4,938,056 A | 7/1990 | DeRudder et al. | 73/49 |
| 4,966,034 A | 10/1990 | Bock et al. | 73/146.5 |
| 5,050,110 A | 9/1991 | Rott | 702/130 |
| 5,140,851 A | 8/1992 | Hettich et al. | 73/146.5 |
| 5,181,975 A | 1/1993 | Pollack et al. | 152/152.1 |
| 5,218,861 A | 6/1993 | Brown et al. | 73/146.5 |
| 5,230,243 A | 7/1993 | Erich | 73/146.3 |
| 5,231,872 A | 8/1993 | Bowler et al. | 73/146.5 |
| 5,274,355 A | 12/1993 | Galan | 340/445 |
| 5,285,189 A | 2/1994 | Nowicki et al. | 340/447 |
| 5,335,540 A * | 8/1994 | Bowler et al. | 73/146.5 |
| 5,345,217 A | 9/1994 | Prottey | 340/442 |
| 5,368,082 A | 11/1994 | Oare et al. | 152/517 |
| 5,500,065 A | 3/1996 | Koch et al. | 156/123 |
| 5,541,574 A | 7/1996 | Lowe et al. | 340/447 |
| 5,569,848 A | 10/1996 | Sharp | 73/146.2 |
| 5,712,616 A | 1/1998 | Schmitt et al. | 340/442 |
| 5,721,374 A | 2/1998 | Siekkinen et al. | 73/146.2 |
| 5,774,047 A | 6/1998 | Hensel, IV | 340/442 |
| 5,825,286 A * | 10/1998 | Coulthard | 340/447 |
| 5,939,977 A * | 8/1999 | Monson | 340/442 |
| 6,271,748 B1 * | 8/2001 | Derbyshire et al. | 340/442 |

FOREIGN PATENT DOCUMENTS

WO    WO01/12453    2/2001

OTHER PUBLICATIONS

Backfisch, K. P. and Dieter S. Heinz Das Reifenbuch 08/92 Mortorbuch Verlag pp167–169.

* cited by examiner

Primary Examiner—Benjamin C. Lee
(74) Attorney, Agent, or Firm—Howard M. Cohn

(57) ABSTRACT

An unsafe operating condition, such as low pressure, of a pneumatic tire is monitored by measuring a temperature (T) of the pneumatic tire, determining (304, 308) rates (R1, R2) at which the tire temperature is changing, and indicating (340) when the rate exceeds predetermined values (A, C). The rate (R1, R2) may be determined with respect to time (t), or with respect to some other parameter such as travel distance (x). The predetermined value (C) may be a function of the tire's rotational velocity (V). The rotation speed (V) of the tire may be taken into account. The driver may be alerted when the temperature exceeds a maximum acceptable operating temperature (D) for the tire, or when the temperature of one tire deviates significantly from the temperatures of the other tires on the vehicle.

17 Claims, 5 Drawing Sheets

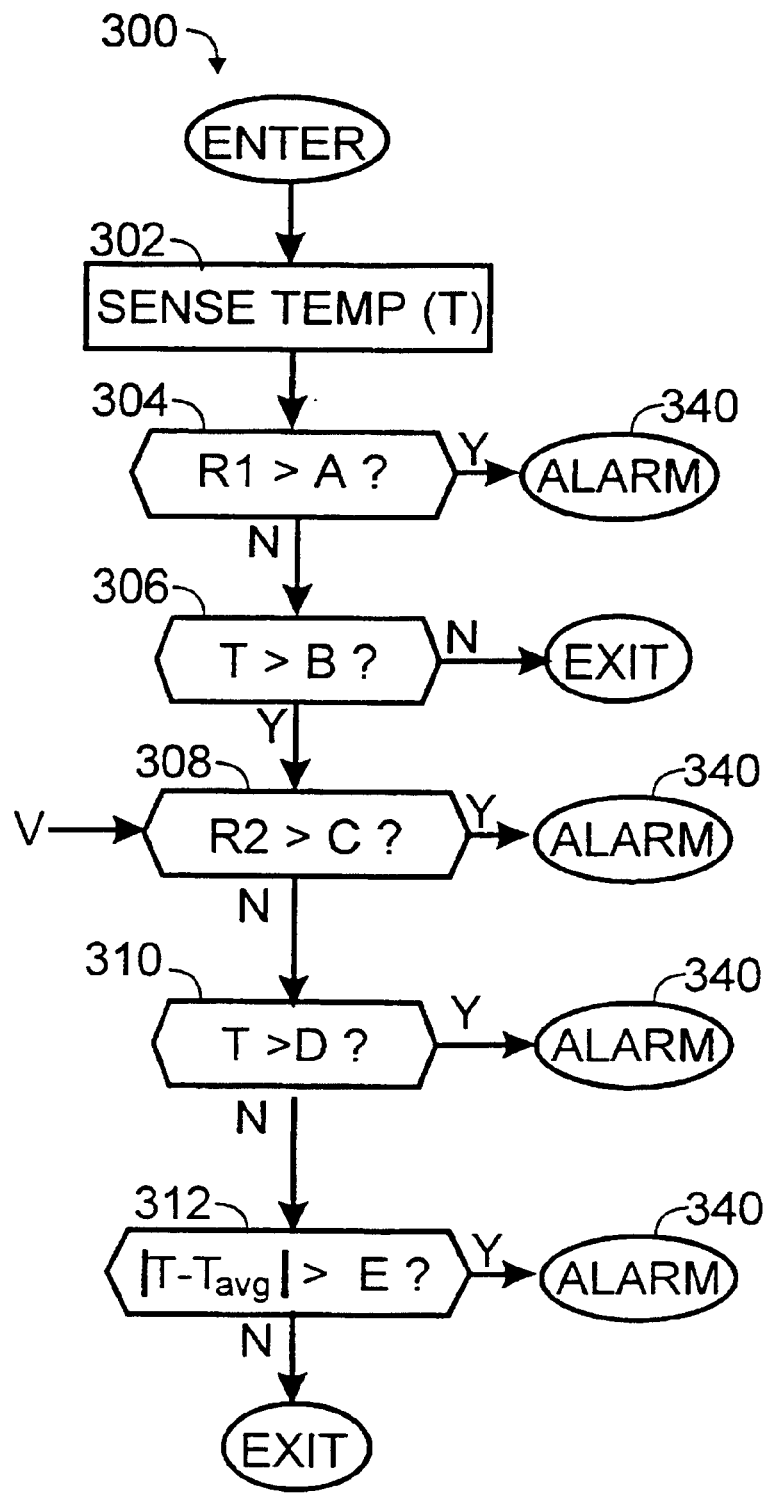

MONITORING A CONDITION OF A PNEUMATIC TIRE

FIELD OF THE INVENTION

The present invention relates to a system for monitoring a condition of a pneumatic tire and, more particularly, for alerting a driver of a vehicle to a faulty tire condition.

BACKGROUND OF THE INVENTION

The Assignee's Ongoing Development Efforts

For a century, the Goodyear Tire & Rubber Company of Akron Ohio, assignee of the present invention, has been the uncontested industry leader in tire product technology. For example, as early as 1892, a puncture-resistant tire was patented. In 1934, a year recognized as the beginning of the run-flat era, Goodyear introduced the Lifeguard (tm) safety tube, a fabric tube within the tire, used commercially by auto makers and on trucks. In 1993, Goodyear's Eagle GS-C EMT (Extended Mobility Technology) tire won the Discover Award for Automotive Technological Innovation. In 1996, the Goodyear Eagle F1 run-flat tire was chosen as standard equipment on the 1997 Chevrolet C-5 Corvette.

Other examples of the strides Goodyear has taken in the advancement of tire and related technologies include, but are not limited to, the following patented inventions:

Commonly-owned U.S. Pat. No. 3,665,387 (Enabnit; 1972), entitled SIGNALLING SYSTEM FOR LOW TIRE CONDITION ON A VEHICLE, incorporated in its entirety by reference herein, discloses a low tire pressure warning system adaptable for any number of wheels of a vehicle and providing dashboard indications of system operation and low pressure conditions while the vehicle is in motion.

Commonly-owned U.S. Pat. No. 3,831,161 (Enabnit; 1974), entitled FAIL-SAFE MONITORING APPARATUS, incorporated in its entirety by reference herein, discloses monitoring vehicle tire pressure wherein the operator is warned of an abnormal or unsafe condition of one or more of the tires.

Commonly-owned U.S. Pat. No. 3,872,424 (Enabnit; 1975), entitled APPARATUS AND METHOD FOR TRANSMITTING AUXILIARY SIGNALS ON EXISTING VEHICLE WIRING, incorporated in its entirety by reference herein, discloses communicating with low tire pressure monitoring circuits using power pulses carried on existing vehicle wiring (e.g., the turn signal circuits).

Commonly-owned U.S. Pat. No. 4,052,696 (Enabnit; 1977), entitled TIRE CONDITION MONITOR, incorporated in its entirety by reference herein, discloses a tire condition sensing circuit that includes a ferrite element that changes from a ferromagnetic to a non-ferromagnetic state in response to a temperature increase above the material Curie point.

Commonly-owned U.S. Pat. No. 4,099,157 (Enabnit; 1978), entitled SINGLE WIRE POWER/SIGNAL SYSTEM FOR VEHICLE AUXILIARY DEVICES, incorporated in its entirety by reference herein, discloses providing both power to and receiving detection signals from a remotely located condition monitoring device using a single wire with ground return through the vehicle frame.

Commonly-owned U.S. Pat. No. 4,911,217 (Dunn, et. al.; 1990), entitled INTEGRATED CIRCUIT TRANSPONDER IN A PNEUMATIC TIRE FOR TIRE IDENTIFICATION, incorporated in its entirety by reference herein, discloses an RF transponder in a pneumatic tire. FIG. 1a of this patent illustrates a prior-art identification system ("reader") that can be used to interrogate and power the transponder within the tire. The identification system includes a portable hand-held module having within it an exciter and associated circuitry for indicating to a user the numerical identification of the tire/transponder in response to an interrogation signal.

Commonly-owned U.S. Pat. No. 5,181,975 (Pollack, et. al.; 1993), entitled INTEGRATED CIRCUIT TRANSPONDER WITH COIL ANTENNA IN A PNEUMATIC TIRE FOR USE IN TIRE IDENTIFICATION, incorporated in its entirety by reference herein, discloses a pneumatic tire having an integrated circuit (IC) transponder and pressure transducer. As described in this patent, in a tire that has already been manufactured, the transponder may be attached to an inner surface of the tire by means of a tire patch or other similar material or device.

Commonly-owned U.S. Pat. No. 5,218,861 (Brown, et al.; 1993), entitled PNEUMATIC TIRE HAVING AN INTEGRATED CIRCUIT TRANSPONDER AND PRESSURE TRANSDUCER, incorporated in its entirety by reference herein, discloses a pneumatic tire having an integrated circuit (IC) transponder and pressure transducer mounted within the pneumatic tire. Upon interrogation (polling) by an external RF signal provided by a "reader", the transponder transmits tire identification and tire pressure data in digitally-coded form. The transponder is "passive" in that it is not self-powered, but rather obtains its operating power from the externally-provided RF signal.

The commonly-owned U.S. Patents referenced immediately hereinabove are indicative of the long-standing, far-reaching and ongoing efforts being made by the Goodyear Tire & Rubber Company in advancing tire product technology.

Tire Condition(s)

Safe, efficient and economical operation of a motor vehicle depends, to a significant degree, on maintaining the correct air pressure in all (each) of the tires of the motor vehicle. Failure to correct quickly for faulty/abnormal (typically low) air pressure may result in excessive tire wear, blow-outs, poor gasoline mileage and steering difficulties.

The need to monitor tire pressure when the tire is in use is highlighted in the context of "run-flat" (driven deflated) tires, tires which are capable of being used in a completely deflated condition. Such run-flat tires, as disclosed for example in commonly-owned U.S. Pat. No. 5,368,082, incorporated in its entirety by reference herein, may incorporate reinforced sidewalls and mechanisms for securing the tire bead to the rim to enable a driver to maintain control over the vehicle after a catastrophic pressure loss, and are evolving to the point where it is becoming less and less noticeable to the driver that the tire has become deflated. The broad purpose behind using run-flat tires is to enable a driver of a vehicle to continue driving on a deflated pneumatic tire for a limited distance (e.g., 50 miles, or 80 kilometers) prior to getting the tire repaired, rather than stopping on the side of the road to repair the deflated tire. Hence, it is generally desirable to provide a low-pressure warning system within the vehicle to alert (e.g., via a light on the dashboard, or a buzzer) the driver to the loss of air in a pneumatic tire.

Systems that measure tire pressure and convey pressure information or a related warning to the user are well known, and typically employ a transponder device and associated sensor(s) which are mounted within the tire. A "transponder" is an electronic apparatus (device) capable of monitoring a condition such as air pressure within a pneumatic tire, and then transmitting that information to an external device, such as an RF (radio frequency) reader/interrogator or, simply an RF receiver. A simple receiver can be used when the transponder is "active", and has its own power source. A reader/interrogator would be used when the transponder is "passive" and is powered by an RF signal from the reader/interrogator. In either case, in conjunction with the external device, the transponder forms a component of an overall tire-condition monitoring/warning system. Examples of these systems can be found in the following US Patents, which are incorporated in their entirety by reference herein: U.S. Pat. Nos. 3,787,806; 4,067,235; 4,909,074; 4,911,217; 5,230,243; 5,285,189; and U.S. Pat. No. 5,731,754.

Tire Temperature

In addition to tire pressure, maintaining tire temperature within a range of temperatures also contributes to the safe, efficient and economical operation of a motor vehicle. As tires are used, they flex and heat up. An under-inflated or overloaded tire tends to run hot from excessive flexing. Ambient temperature can also contribute to a tire heating up. Braking devices may also contribute to the tire heating up. Excessive tire temperature can lead to delamination of the tire.

U.S. Pat. No. 3,281,784 (Farthing; 1966), incorporated in its entirety by reference herein, discloses devices for indicating pressure or temperature changes in pneumatic tires. The transducer(s) are in the tire and are connected in a balanced bridge circuit. An indication of instantaneous temperature can be obtained, such as with a galvanometer, or with lights of varying brilliance.

U.S. Pat. No. 3,510,835 (Gilbert; 1970), incorporated in its entirety by reference herein, discloses a tire temperature alarm system. A temperature sensor is in contact with the tire and an inductive coupling system to the vehicle so that when the heat reaches a predetermined degree, a warning device is activated.

U.S. Pat. No. 4,334,215 (Frazier, et al.; 1982), incorporated in its entirety by reference herein, discloses a continuous heat and pressure surveillance system for pneumatic tires. A monitoring transmitter within the tire utilizes a thermistor in thermal contact with the tire to sense an abnormally high temperature.

U.S. Pat. No. 4,570,152 (Melton, et al.; 1986), incorporated in its entirety by reference herein, discloses a tire monitor system wherein magnetic studs are embedded into the body of a pneumatic tire, a magnetic field sensor is mounted upon a non-rotating portion of the vehicle adjacent to the tire. When the temperature increases to a selected point and the magnetic field decreases accordingly, a display device is utilized to generate a visual and/or audible indication of imminent tire failure.

U.S. Pat. No. 4,760,371 (Don; 1988), incorporated in its entirety by reference herein, discloses a vehicle tire monitoring system. Radiated heat sensing detectors are mounted near the tires in the wheel arches (wheel wells). A comparison is made between each sensor output and a norm, such as ambient temperature from air temperature detectors or the mean of all the sensor outputs, and significant departure from that norm triggers an alarm.

U.S. Pat. No. 4,893,110 (Hebert; 1990), incorporated in its entirety by reference herein, discloses a process for detecting anomalies by use of pressure and temperature measurements in a tire-monitoring device. Absolute temperature and pressure are measured, then a ratio for each of the tires is calculated. The calculated ratios are then compared with one another to provide an indicator "N". An alarm is issued when the indicator N deviates from a predetermined range of values.

U.S. Pat. No. 4,966,034 (Bock, et al.; 1990), incorporated in its entirety by reference herein, discloses a tire pressure indicating system performing temperature compensated pressure measurement. Using a temperature measurement to compensate for temperature-induced measuring errors is generally well known.

U.S. Pat. No. 5,050,110 (Rott; 1991), incorporated in its entirety by reference herein, discloses a process and mechanism for determining the effective air temperature in at least one pneumatic tire of a vehicle. The temperature in the immediate environment of a vehicle brake disc or brake drum, as well as the temperature in the immediate environment of the vehicle is sensed. From these measured temperature values, the effective air temperature in the respective pneumatic vehicle tire is then calculated.

U.S. Pat. No. 5,140,851 (Hettich, et. al.; 1992), incorporated in its entirety by reference herein, discloses a circuit arrangement for monitoring pressure and temperature of tires wherein corrections are made to the measured value of a wheel-mounted temperature sensor to determine the actual temperature of the air in the tire.

U.S. Pat. No. 5,274,355 (Galan; 1993), incorporated in its entirety by reference herein, discloses a system for monitoring pressure and temperature of pneumatic tires on a moving vehicle. Detector elements are used to identify those tires whose sidewall temperature is significantly higher than the sidewall temperatures of the other tires. An average reading for the temperature of all four tires is taken during a first interval, and during a second interval the temperature of each tire is compared to the average. If the difference exceeds a predetermined amount, an appropriate signal can be provided to the vehicle operator.

U.S. Pat. No. 5,500,065 (Koch, et al.; 1996), incorporated in its entirety by reference herein, discloses a method for embedding a monitoring device ("tag") within a tire during manufacture. The device can be used for monitoring, storing and telemetering information such as temperature, pressure, tire mileage and/or other operating conditions of a pneumatic tire, along with tire identification information.

Processing Information

As discussed hereinabove, a tire condition (e.g., pressure, temperature) may be measured, and a warning sounded when the condition exceeds a predetermined threshold amount. This is a straightforward "first order" approach to identifying a problem. Other techniques are known, which involve taking measurements and making calculations and the like, which are suitably performed in an on-board interrogator (e.g., 108) including a microprocessor-based computing device (e.g., 116).

U.S. Pat. No. 4,938,056 (DeRudder, et al.; 1990), incorporated in its entirety by reference herein, discloses determining the air permeability of a tire. Preferably a tire being tested is placed in an insulated enclosure to protect the tire and sensing means from external disturbances. The pressure in the tire is sensed. Temperature is sensed to correct the pressure measurement. A plurality of corrected pressure values are stored. The stored corrected pressure values are linearized to provide another value indicative of the rate of change of pressure in the tire.

As discussed hereinabove (see, e.g., U.S. Pat. No. 5,274,355), an excessive difference between a reading for the temperature of one tire compared to the average reading for the is temperature of all four tires can be indicative of a problem.

U.S. Pat. No. 5,345,217 (Prottey; U.S. Pat. No. 5,345,217), incorporated in its entirely by reference herein, discloses detecting a deflated condition of a tire on a vehicle by measuring the rotation of the respective wheels. The speed of each wheel is compared to the average speed of the four wheels to determine if a tire is deflated. The method includes selecting an appropriate interval for deflation detection, and repeating the measuring step for at least three consecutive successive equal intervals.

U.S. Pat. No. 5,569,848 (Sharp; 1996), incorporated in its entirety by reference herein, discloses determining a value representative of tire inflation pressure by measuring vehicle speed, ambient temperature and wheel speed, and displaying the result on a readout.

U.S. Pat. No. 5,712,616 (Schmitt, et al.; 1998), incorporated in its entirety by reference herein, discloses a system for monitoring a condition of tires. An evaluation circuit forms quotients based on detected wheel speeds, and compares the quotients to each other. Depending on the results of the comparison, a signal which represents the condition of the tires is generated, which signal activates a display for the benefit of the driver. In a preferred embodiment, the rate of change of the quotients over time is determined.

U.S. Pat. No. 5,721,374 (Siekkinen, et al.; 1998), incorporated in its entirety by reference herein, discloses a method of detecting low tire pressure by measuring wheel speed difference between the front tires and between the rear tires, and then calculating the difference between those two differences, characterized by including a unique learning algorithm and progressive sensitivity of detection. Offsets are determined for various speed ranges.

Processing data indicative of speed to determine low tire pressure is useful in that it can eliminate the need for a tire pressure sensor, but is subject to error from speed differences due to tire diameter (e.g. new tire versus used tire), slippery pavement and turning.

SUMMARY OF THE INVENTION

It is an aspect of the present invention to provide a technique for monitoring a condition of a pneumatic tire, as defined in one or more of the appended claims and, as such, having the capability of being implemented to accomplish one or more of the subsidiary objects.

According to the invention, a tire's temperature is monitored, and a rate at which the tire's temperature changes is utilized to provide an indication of an abnormal tire condition to the driver of the vehicle.

The rate of change of tire temperature can be the instantaneous time derivative (dT/dt where t=time), or the differential of temperature over a finite time (DT/Dt), or some other function of temperature change such as d(log T)/dt and log (dT/dt), or a rate with respect to a parameter such as distance (dT/dx where x=travel distance). The rate of change of tire temperature can be the instantaneous second time derivative ($d^2T/dt^2$), or second differential over a finite time ($D^2T/Dt^2$), or some rate function (e.g., $d^2(\log T)/dt^2$), or rate with respect to another parameter (e.g., $d^2T/dx^2$).

It is also within the scope of the invention that the temperature or temperature rate can be integrated over a period of time and compared to a threshold to monitor the tire condition.

The overall general concept is to measure the rate at which energy is being accumulated (manifest) as heat (dT/dt) in an object, such as a pneumatic tire, and using that rate of energy accumulation, to alert the user to an unsafe condition.

It has been observed that as a vehicle travels, a tire's temperature "T" increases, then tends to level off as a function of the tire's pressure, speed, construction, and wear. It is believed that a correlation may be made with a high degree of confidence between excessive temperature rate of change and insufficient tire pressure. Hence, the technique of the present invention may be used in lieu of directly sensing pressure with a pressure sensor, or used in conjunction with sensing pressure.

Variations on the basic concept of alerting the driver when the tire temperature rate exceeds various thresholds include the steps of: a) factoring the rotational speed of the tire into the analysis; b) alerting the driver when the temperature exceeds a maximum acceptable operating temperature for the tire; c) alerting the driver when the temperature of one tire deviates significantly from the temperatures of other tires on the vehicle; and d) waiting until certain initial conditions are met (such as whether the tire has warmed up) before analyzing temperature rate of change.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

Elements of the figures are typically numbered as follows. The most significant digits (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in an other figure. In some cases, similar (including identical) elements may be referred to with similar numbers in a single drawing.

For example, each of a plurality of elements 199 may be referred to individually as 199a, 199b, 199c, etc. Such relationships, if any, between similar elements in the same or different figures will become apparent throughout the specification, including, if applicable, in the claims and abstract.

Figure 1:
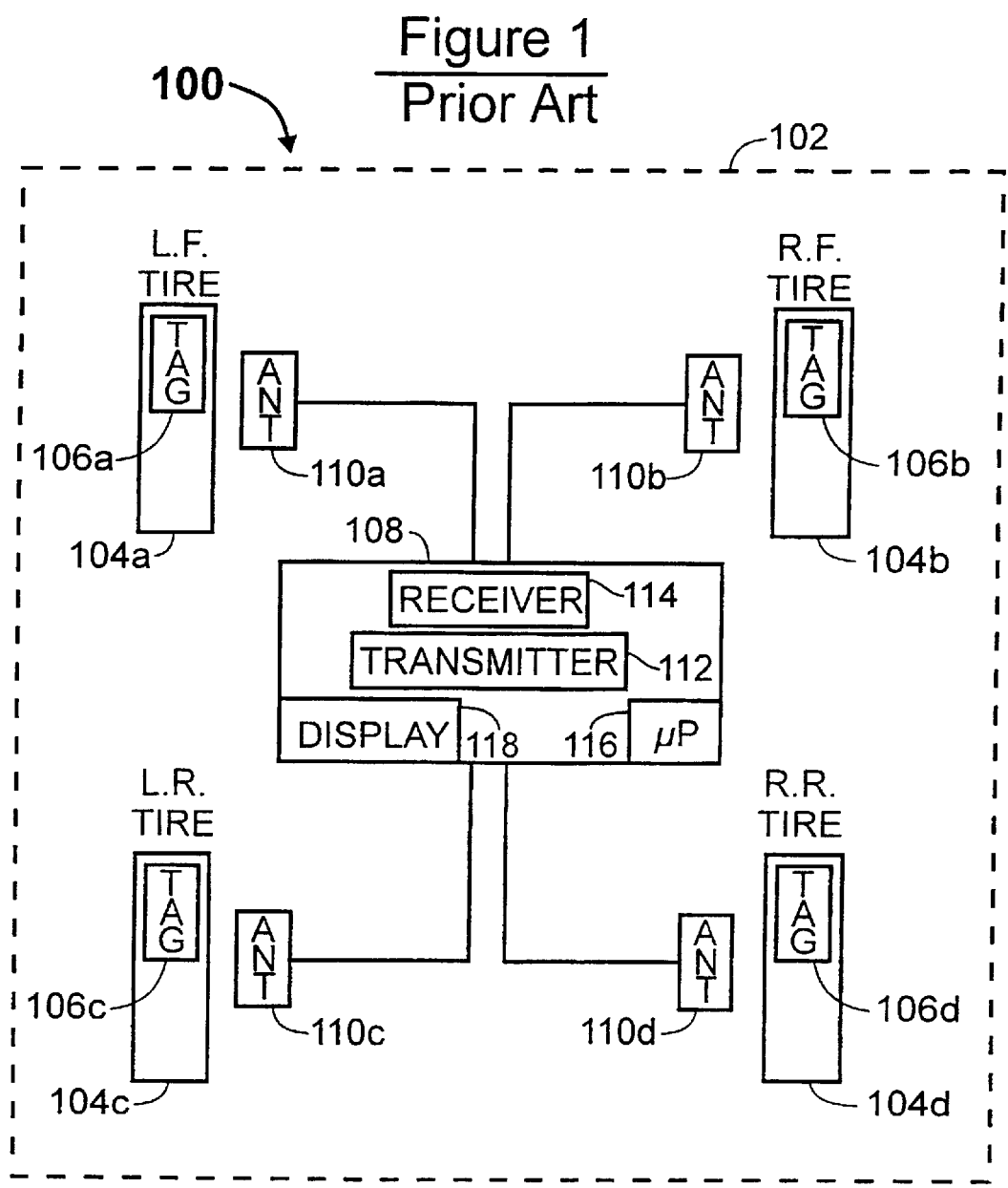
Figure 1A:
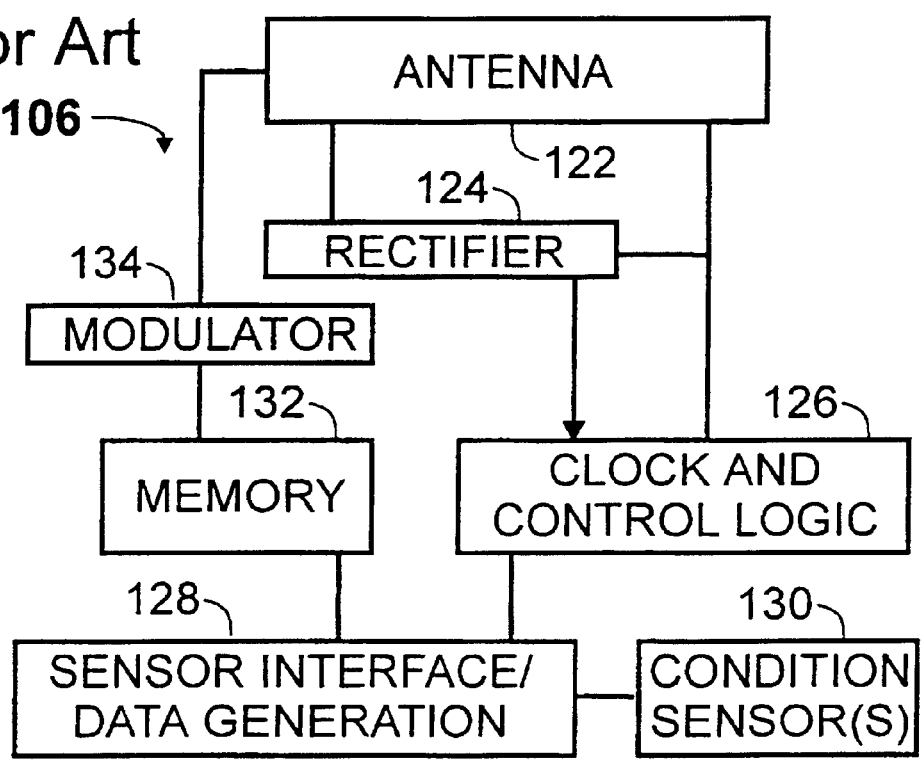
Figure 2:
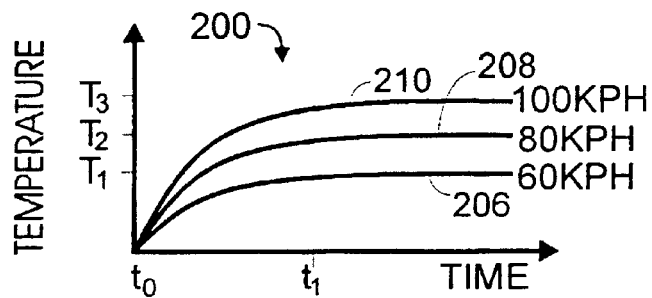
Figure 2A:
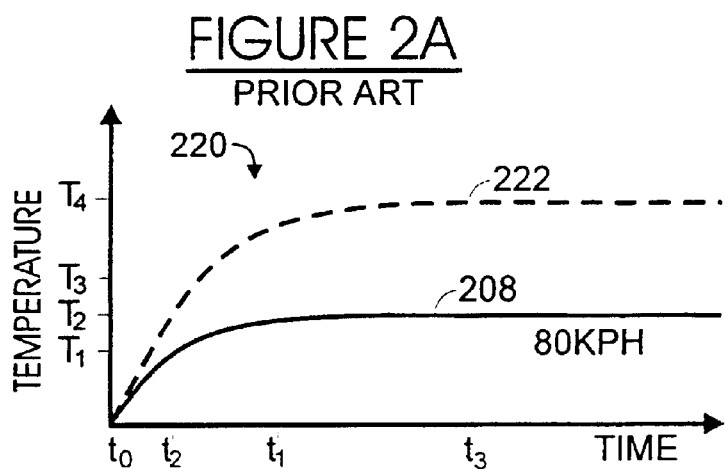
Figure 2B:
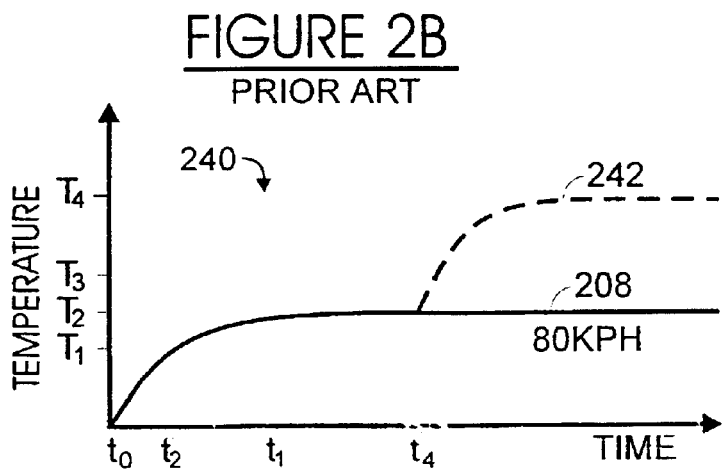
Figure 4:
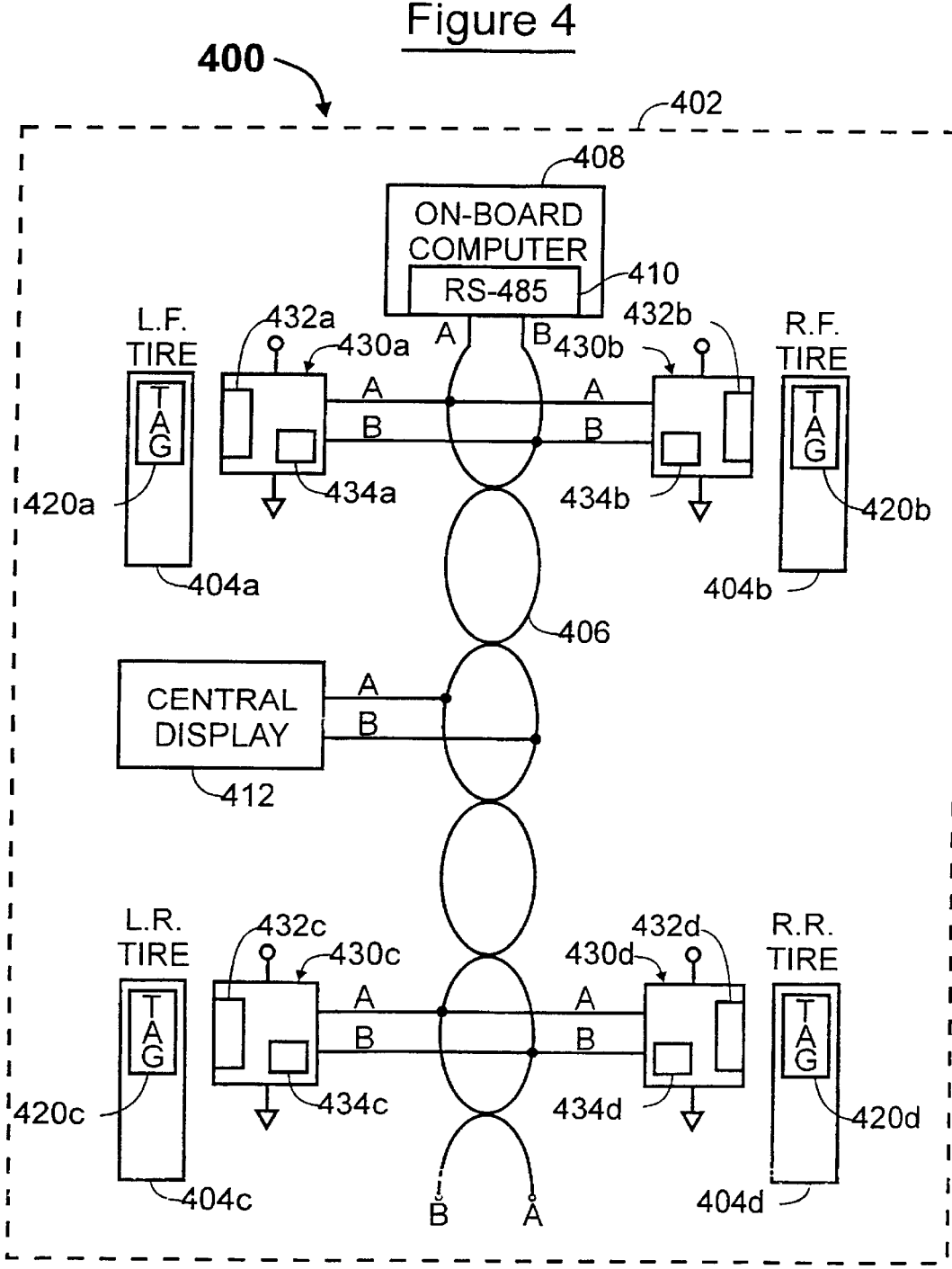

The structure, operation, and advantages of the present preferred embodiment of the invention will become further apparent upon consideration of the following description taken in conjunction with the accompanying drawings, wherein:

FIG. 1 is a simplified block diagram of a tire condition monitoring system, according to the prior art;

FIG. 1A is a simplified block diagram of a passive transponder for the tire condition monitoring system of FIG. 1, according to the prior art;

FIG. 2 is a graph illustrating a temperature profile for a properly-inflated pneumatic tire, at three different vehicle speeds;

FIG. 2A is a graph illustrating a temperature profile for an under-inflated pneumatic tire;

FIG. 2B is a graph illustrating a temperature profile for a pneumatic tire which becomes under-inflated while driving;

FIG. 3 is a flow chart of a computer program for implementing the present invention in an existing tire condition warning system, such as the system of FIG. 1, according to the invention; and FIG. 4 is a block diagram of a condition monitoring system, according to the invention.

DETAILED DESCRIPTION OF THE INVENTION

Tire Condition Monitoring Systems

Systems for monitoring conditions of tires are well known. A condition of paramount interest which is monitored in pneumatic tires is air pressure. An exemplary system is shown in FIG. 1 which illustrates a typical tire pressure monitoring system 100 of the prior art installed on a motor vehicle 102 (shown in dashed lines) having four pneumatic tires 104a ... 104d installed on four respective wheels (not shown). A transponder ("TAG") 106a ... 106d is disposed within each of the tires 104a ... 104d, respectively. The transponders 106a ... 106d are preferably passive transponders which obtain their operating power from an RF signal such as is typically generated by an on-board interrogator 108 which is mounted within the vehicle.

The interrogator 108 comprises an RF transmitter 112 (e.g., for powering passive transponders), an RF receiver 114, control logic 116 which may include a microprocessor ($\mu$P), and a display device 118 such a visual display and optionally including an audible alarm. Antennas ("ANT") 110a ... 110d are disposed on the vehicle 102, preferably adjacent the tires 104a ... 104d, respectively, such as in the wheel wells of the vehicle. The antennas 110a ... 110d are suitably ferrite loopstick antennas.

The use of multiple vehicle antennas 110a ... 110d, each at a fixed position on the vehicle adjacent a respective tire 104a ... 104d is well known and preferred, and is disclosed in U.S. Pat. Nos. 3,553,060; 3,810,090; 4,220,907; 5,541, 574; and U.S. Pat. No. 5,774,047, all of which are incorporated in their entirety by reference herein.

In use, the interrogator 108 powers the transponders 106a ... 106d which, in turn, transmit data indicative of a measured condition (e.g., air pressure) back to the interrogator. In any such system, it is desirable to have efficient and effective coupling of signals between the fixed antennas 110a ... 10d (alternatively, one centrally-located fixed antenna) and the moving (i.e., when the vehicle is in motion) transponders (each of which has its own antenna, not shown).

FIG. 1A illustrates, generally, an exemplary passive RF transponder 106 (compare any of 106a ... 106d) of the prior art. An antenna 122, such as a coil antenna, receives a carrier signal from the interrogator 108 (via antennas 110a ... 110d). The carrier signal, of frequency F, is rectified by a rectifier circuit 124 connected to the transponder's antenna 122 in order to generate operating power for active circuitry in the transponder—in this example, for clock and control logic circuitry 126 and for sensor interface and data generation circuitry 128. Data derived from one or more condition sensor(s) 130, such as a temperature sensor and a pressure sensor, is optionally stored in memory 132, and is encoded (e.g., digitized) and mixed with the carrier signal in a modulator circuit 134. The output of the modulator circuit 134 is transmitted via the antenna 122 back to the interrogator 108.

Tire Temperature

The system 100 described hereinabove is typical of any system which is capable of measuring one or more tire conditions and manipulating data. Of particular interest to the present invention is manipulating data obtained by measuring the instantaneous temperature of a pneumatic tire.

FIG. 2 is a graph 200 illustrating how the temperature (vertical axis 202) of a properly-inflated pneumatic vehicle tire increases with time (horizontal axis 204) as a vehicle is driven. At an initial time "$t_0$" defined as "at-rest prior to driving the vehicle, the tire temperature is substantially ambient "$T_0$". The characteristic increase in temperature, depending upon driving speed, is shown by the three lines 206, 208 and 210, for speeds of 60 kph, 80 kph and 100 kph, respectively. As is evident, at the speeds of 60 kph, 80 kph and 100 kph, the tire's temperature rises in a "warming up" time interval between times $t_0$ and $t_1$, then substantially levels off (after $t_1$) at temperatures of $T_1$, $T_2$ and $T_3$, respectively. The illustrated dependency of temperature upon time is a valid generalization, and one having ordinary skill in the art will appreciate that tire temperature is a function of many factors including, but not limited to, ambient conditions, road conditions, tire age and wear, tire traction, loads imposed on the tire, and the like.

FIG. 2A is a graph 220 illustrating how a tire's temperature may change over time when it is driven in an under-inflated condition. The temperature profile line 208 from FIG. 2 is reproduced in this graph 200 for comparison against the temperature profile of a properly-inflated tire. The line 222 illustrates a temperature profile for the tire when it is under-inflated from the very beginning, at $t_0$. As is evident, the temperature of the under-inflated tire increases more rapidly (has a greater slope) than the temperature of the properly-inflated tire. In other words, the temperature rate of change is greater for an under-inflated tire than for a properly-inflated tire. As is also evident from looking at the line 222 the temperature of the under-inflated tire:

(i) passes through the level-off temperature $T_2$ at a time $t_2$ which is between $t_0$ and $t_1$, and (ii) reaches a higher temperature, $T_4$ than that the level-off temperature $T_2$ of the properly-inflated tire.

FIG. 2B is a graph 240, similar to the previous graph 220, illustrating another example of how a tire's temperature may change over time when it is driven in an under-inflated condition. The temperature profile line 208 from FIG. 2 is reproduced in this graph 200 for comparison against the temperature profile of a properly-inflated tire. The line 222 represents a case where the tire develops an under-inflation problem at a time $t_4$, after running for a while and having already been driven and reached the level-off temperature $T_2$. As is evident, the temperature of the under-inflated tire:

(i) increases at a significant rate from the level-off temperature $T_2$, and (ii) increases to a significantly higher temperature $T_4$ than the level-off temperature $T_2$.

Monitoring Temperature Of The Tires

According to the invention, the instantaneous temperature of a pneumatic tire is monitored and the information derived therefrom is utilized in a "predictive" manner to alert the driver of a vehicle to abnormal conditions which may be precursors to unsafe tire conditions, such as a signaling an imminent flat tire. In the context of run-flat tires, although they may be driven safely while deflated, they should be repaired or replaced at the driver's earliest convenience.

Principally, it is the rate of change of temperature which is monitored for each tire on a vehicle, using any suitable measuring apparatus such as the condition monitoring system 100 described hereinabove.

FIG. 3 is a flowchart 300 illustrating an example of how the temperature of a vehicle tire is monitored, and under what conditions an indication of an abnormal condition is provided to the driver of the vehicle. A computer program implementing the technique outlined in the flowchart 300 is readily executed by control logic (e.g., 116) in an "intelligent" interrogator (e.g., 108) which, based on the conditions described in the flowchart 300 can indicate to the driver either visually or audibly (compare 118) that a particular tire condition indicative of a problem has been determined.

In a first step 302, the instantaneous (current) tire temperature (T) is sensed using any suitable technique such as the techniques described hereinabove. This may be the actual temperature of the tire, or a "compensated" temperature which is adjusted for ambient temperature, tire rotational velocity (V), tire loading, and the like.

Next, in a step 304, the first rate ("R1") of change of the temperature is determined (calculated). Typically, the first rate ("R1") would be determined with respect to time. For example, the temperature is changing at a rate of 0.2° C. per second. It is within the scope of the invention that the temperature change rate with respect to time can be:

(i) the instantaneous time derivative (dT/dt where t=time);
(ii) the differential of temperature over a finite time (DT/Dt); or
(iii) some other function of temperature change such as d(log T)/dt and log (dT/dt).

It is within the scope of the invention that the rate of change of temperature can also be the instantaneous second time derivative ($d^2T/dt^2$), or second differential over a finite time ($D^2T/Dt^2$), or some other rate function (e.g., $d^2$(log T)/dt$^2$)

It is also within the scope of the invention that the temperature rate of change can be determined with respect to a parameter other than time, such as distance (i.e., dT/dx, $d^2T/dx^2$, or the like, where x=travel distance).

It is also within the scope of the invention that a "corrected" tire temperature $T_C$ may be calculated and utilized in the rate determinations, wherein $T_C$ is the measured tire temperature minus the ambient temperature.

If, in the step 304, the rate is greater than a predetermined value "A", the program proceeds to a step 340 wherein an indication of an excessive temperature rate is provided to the driver of the vehicle, such as by an audible alarm or a visual display.

This first step 304 is generally geared towards detecting a problem with a "cold" tire which is under-inflated and just beginning to rotate (e.g., a tire that went flat overnight), such as was described hereinabove with respect to FIG. 2A.

In a next series of steps 306 and 308, problems with an already warmed up tire can be detected. These steps are generally geared towards detecting a problem with a warmed-up tire which becomes under-inflated while driving, such as was described hereinabove with respect to FIG. 2B.

First, in the step 306, it is determined whether the tire temperature is greater than a predetermined value "B", which is a "warm-up" temperature, such as 35° C. The warm-up temperature is selected to be approximately 10–20° C. over the ambient temperature which may also be measured, such as by a vehicle's climate control system. If the tire is already warmed up, it is determined in the step 308 whether a second rate ("R2") of change of the temperature for the tire exceeds a predetermined value "C" which may (or may not) be different than the value "A". The various ways in which the first rate R1 was determined may also be employed in determining the second rate R2. If the second rate R2 exceeds the value "C", the program proceeds to the step 340 wherein the aforementioned indication (340) of an excessive temperature rate is provided to the driver of the vehicle. It is within the scope of this invention that there are a number of distinct values for the predetermined value "C", each based on a given range of rotational speeds of the tire, such as discussed hereinabove with respect to FIG. 2, or that value "C" is any function of the rotational speed (V) of the tire.

As indicated by FIG. 2, an already warmed up tire exhibits a fairly constant temperature (e.g., $T_1$, $T_2$, $T_3$) and relatively low (e.g., nearly zero, at constant speed) temperature rate of change. It is therefore within the scope of this invention that the step 304 can be omitted, and a rate (e.g., R2) in excess of a value (e.g., "C") can be checked only after predetermined initial conditions have been met, such as a certain temperature (e.g., "B") having been achieved and/or the temperature rate has previously tapered off to a minimum amount (e.g., <0.1°C/sec) for a period of time (t).

In a next step 310, it is determined whether the temperature of the tire exceeds a value "D", which is a maximum acceptable operating temperature for the tire. It should be understood that this (310) is not a rate-based determination, rather it is a straightforward determination of whether the tire is, simply stated, too hot. If so (Y), the program proceeds to the step 340 to provide the aforementioned indication of there being a problem with the tire.

The aforementioned tests (e.g., 304, 308, 310) are preferably performed for each and every one of the tires on the vehicle. Generally, if any of the prescribed conditions are met, the driver is alerted to a faulty condition of the tire.

In a next step 312, the condition of a given tire is compared with comparable conditions of the other tires on the vehicle. For example, the temperature (T) of a given tire can be compared with the average temperature ($T_{avg}$) for the other tires on the vehicle and, if the temperature (T) of the given tire deviates in excess of a predetermined amount "E" from the average ($T_{avg}$), the program proceeds to the step 340 to provide the aforementioned indication of there being a problem with the given tire. Alternatively, a discrepancy in the temperature rate of a given tire versus the temperature rate(s) of other "comparable" tires on the vehicle can indicate a faulty condition. Since the front and back tires experience different load, torque and tread friction, and braking forces, comparisons may be made between each tire and its neighbor (e.g., front left compared to front right) instead of comparing to the average of all 4 tires.

In light of the descriptions set forth hereinabove, one having ordinary skill in the art to which the present invention most nearly pertains will appreciate that, in order to minimize "false alarms" such as may occur from spurious signals, repeated (e.g., three in a row) indications of a fault (e.g., repeated occurrences of T>B) should be noted before proceeding to the step 340.

One having ordinary skill in the art to which the present invention most nearly pertains will appreciate that certain initial steps may be performed, such as first determining whether the tire is rotating, or has reached some threshold speed, prior to executing the program 300. For example, the temperature profile may not be reliable when the tire is rotating below a certain threshold speed.

An Exemplary System

FIG. 4 shows an embodiment of a condition monitoring system 400, installed on a vehicle 402 (shown in dashed lines), such as a typical passenger vehicle having four pneumatic tires 404a, 404b, 404c and 404d installed on four respective wheels (not shown).

The vehicle 402 is preferably equipped with an RS-485 (or equivalent) multiplexed serial data bus 406 controlled by an on-board vehicle computer (computing device) 408 having an RS-485 interface 410. Preferably, a central display unit 412 is connected either directly to the computer 408 or is operatively connected (as shown) to the computer 408 via the data bus 406. The data bus 406 is suitably a twisted pair of insulated wires (labeled "A" and "B"), preferably with a minimum of one twist per inch.

It is within the scope of the invention that if no data bus is provided on the vehicle, one can be added thereto. For example, in the absence of an existing vehicle data bus, a dedicated data bus may be provided, such as a bidirectional data bus conforming to RS-485 or other suitable serial communications standards.

Each of the four tires 404a . . . 404d is equipped with an electronic module ("TAG") 420a . . . 420d, respectively, and associated sensor (not shown, well known) capable of monitoring one or more conditions such as air pressure and air temperature within the tire, and of transmitting a radio frequency (RF) signal indicative of (e.g., modulated as a function of) the monitored condition(s) within the respective vehicle tire. In the context of the present invention, tire temperature is monitored. The tags 420a . . . 420d are suitably transponders, but may alternatively simply comprise one or more condition sensors and a radio frequency transmitter, as described hereinabove.

The system 400 comprises four monitors (or "interrogation units") 430a . . . 430d, each associated with a respective one of the tires 404a . . . 404d and preferably located in proximity therewith, such as mounted within the wheel wells of the vehicle.

Each monitor 430a . . . 430d is connected to a source of power (as indicated by the lines terminating in circles and triangles) and is connected to the multiplexed serial data bus 406 for individually communicating with the on-board computer 408.

Each monitor 430a . . . 430d comprises an antenna 432a . . . 432d, respectively, a receiver 434a . . . 434d for receiving transmissions from the associated tag 420a . . . 420d, respectively, and a transmitter (not shown) for transmitting to (and optionally powering) a respective one of the tags 420a . . . 420d. Each monitor 430a . . . 430d includes a suitable data transceiver (not shown), such as the DS36277 Dominant Mode Multipoint Transceiver by National Semiconductor, to facilitate two-way data transmission via the data bus 406.

A monitor's transmissions to the respective tag may comprise a carrier signal for energizing a passive tag, and may comprise signals to "wake up" an active tag which is in a low-power sleep mode. All components of the monitor (430), including the antenna (432) can be encapsulated in a single package. Alternatively, the antenna (432) can be disposed outside of such a package.

Monitored condition information, namely instantaneous tire temperature, carried by the RF signals from the respective tags 420a . . . 420d can be decoded (e.g., demodulated) and provided to the on-board computer 408, which is suitably programmed with a computer program such as the program 300 described hereinabove, to alert the operator of the vehicle to an unsafe operating condition, such as low pressure, of a pneumatic tire, such as via the display unit 412.

While the invention has been described in combination with embodiments thereof, it is evident that many alternatives, modifications, and variations will be apparent to those skilled in the art in light of the foregoing description. Accordingly, it is intended to embrace all such alternatives, modifications and variations as fall within the spirit and scope of the appended claims.

What is claimed is:

1. A method of monitoring for an unsafe operating condition of a pneumatic tire on a vehicle, the method characterized by:
   measuring a temperature of the pneumatic tire;
   determining a first rate at which the temperature is changing; and
   indicating when the first rate exceeds a first predetermined value;
   characterized by:
      determining whether the temperature exceeds a second predetermined
      value and, if so, determining whether a second rate at which the
      temperature is changing exceeds a third predetermined value; and
      indicating that the second rate exceeds the third predetermined value.

2. Method, according to claim 1, characterized in that:
the unsafe operating condition being monitored is low tire pressure.

3. Method, according to claim 1, characterized in that:
the first rate is the rate at which the temperature is changing with respect to time.

4. Method, according to claim 1, characterized in that:
the first rate is selected from the group consisting of:
   (a) an instantaneous time derivative of temperature;
   (b) a differential of temperature over a finite time;
   (c) an instantaneous second time derivative of temperature; and
   (d) a second differential of temperature over a finite time.

5. Method, according to claim 1, characterized in that:
the second predetermined value is between approximately 10° C. and 20° C. over ambient temperature.

6. Method, according to claim 1, characterized in that:
the third predetermined value is a function of the rotational speed of the tire.

7. Method, according to claim 1, characterized by:
determining whether the temperature exceeds a fourth predetermined value; and
indicating that the temperature exceeds the fourth predetermined value.

8. Method, according to claim 7, characterized in that:
the fourth predetermined value is a maximum acceptable operating temperature of the tire.

9. Method, according to claim 1, characterized by:
determining whether the temperature of the tire deviates in excess of a fourth predetermined value from temperatures of other tires on the vehicle; and
indicating that the temperature of the tire deviates in excess of the fourth predetermined value.

10. Method, according to claim 1, characterized by indicating when the first rate exceeds the first predetermined value only after predetermined initial conditions are met, and the predetermined initial conditions are: a predetermined value for temperature has been achieved, or the first rate has previously tapered off to a minimum amount for a period of time.

11. Method, according to claim 1, characterized in that:
the first rate is the rate at which the temperature is changing with respect to travel distance.

12. Method, according to claim 1, characterized in that:
the temperature is a corrected temperature which is tire temperature minus ambient temperature.

13. In a vehicle having pneumatic tires, a system for monitoring for an unsafe tire operating condition comprising:
- an RF tag disposed in each of the vehicle tires for transmitting a signal indicative of the temperature of the tire; and
- at least one interrogation unit for receiving the signals transmitted by the RF tags;

the system characterized by:
- a computing device connected to the at least one interrogation unit for determining a rate at which the tire temperature is changing; and
- a display for indicating when the rate exceeds a first predetermined value; and
- means for determining whether the temperature exceeds a second predetermined value and, if so, determining whether a second rate at which the temperature is changing exceeds a third predetermined value; and indicating that the second rate exceeds the third predetermined value.

14. System, according to claim 13, characterized in that:

the unsafe tire operating condition being monitored is low tire pressure.

15. System, according to claim 13, characterized in that:

the first rate is the rate at which the temperature is changing with respect to time.

16. System, according to claim 13, characterized in that:

the first rate is selected from the group consisting of:
- (a) an instantaneous time derivative of temperature;
- (b) a differential of temperature over a finite time;
- (c) an instantaneous second time derivative of temperature; and
- (d) a second differential of temperature over a finite time.

17. System, according to claim 13, characterized by:

an interrogation unit and corresponding antenna disposed adjacent each tire.

* * * * *